(12) United States Patent
Li et al.

(10) Patent No.: US 12,710,610 B2
(45) Date of Patent: Aug. 18, 2026

(54) DUAL-SIDED SPLICE CASSETTE

(71) Applicant: COMMSCOPE TECHNOLOGIES LLC, Hickory, NC (US)

(72) Inventors: Hui Li, Suzhou (CN); Wenlan Han, Shanghai (CN); Min Dong, Suzhou (CN)

(73) Assignee: COMMSCOPE TECHNOLOGIES LLC, Claremount, NC (US)

( * ) Notice: Subject to any disclaimer, the term of this patent is extended or adjusted under 35 U.S.C. 154(b) by 538 days.

(21) Appl. No.: 17/635,577

(22) PCT Filed: Aug. 15, 2019

(86) PCT No.: PCT/CN2019/100774

§ 371 (c)(1),
(2) Date: Feb. 15, 2022

(87) PCT Pub. No.: WO2021/026879

PCT Pub. Date: Feb. 18, 2021

(65) Prior Publication Data

US 2022/0299726 A1 Sep. 22, 2022

(51) Int. Cl.
*G02B 6/44* (2006.01)

(52) U.S. Cl.
CPC .................................. *G02B 6/4454* (2013.01)

(58) Field of Classification Search
CPC .................................................... G02B 6/4454
USPC .......................................................... 385/135
See application file for complete search history.

(56) References Cited

U.S. PATENT DOCUMENTS

| | | | | |
|---|---|---|---|---|
| 5,071,211 | A | 12/1991 | Debortoli et al. | |
| 8,348,517 | B2 | 1/2013 | Mudd et al. | |
| 8,385,711 | B2 | 2/2013 | Fabrykowski et al. | |
| 8,422,846 | B2 | 4/2013 | Ruiz et al. | |
| 2007/0047891 | A1* | 3/2007 | Bayazit ................ | G02B 6/4471 385/137 |
| 2009/0324189 | A1 | 12/2009 | Hill et al. | |
| 2010/0061693 | A1 | 3/2010 | Bran De Leon et al. | |
| 2010/0142910 | A1 | 6/2010 | Hill et al. | |
| 2011/0097052 | A1 | 4/2011 | Solheid et al. | |

(Continued)

FOREIGN PATENT DOCUMENTS

| | | | |
|---|---|---|---|
| CN | 201589882 | U | 9/2010 |
| CN | 102323648 | A | 1/2012 |

(Continued)

OTHER PUBLICATIONS

International Search Report and Written Opinion of the International Searching Authority for International Patent Application No. PCT/CN2019/100774 mailed Apr. 26, 2020, 10 pages.

(Continued)

*Primary Examiner* — Jerry M Blevins
(74) *Attorney, Agent, or Firm* — Merchant & Gould P.C.

(57) ABSTRACT

A splice cassette (100) includes a housing (114) which defines a first and a second interiors (132,134) facing in opposite directions. A first splice region (150) is disposed in the first interior (132) and a second splice region (152) is disposed in the second interior (134). A splice holder (180, 185) can be mounted removably at one or more of the splice regions (150,152).

26 Claims, 13 Drawing Sheets

(56) References Cited

U.S. PATENT DOCUMENTS

| | | | | |
|---|---|---|---|---|
| 2015/0117829 | A1* | 4/2015 | Allen | G02B 6/44528 385/135 |
| 2015/0364876 | A1* | 12/2015 | Grandidge | G02B 6/4455 439/544 |
| 2017/0329096 | A1 | 11/2017 | Allen | |

FOREIGN PATENT DOCUMENTS

| | | | | |
|---|---|---|---|---|
| CN | 102985859 | A | 3/2013 | |
| CN | 104216082 | A | 12/2014 | |
| CN | 107807426 | A | 3/2018 | |
| EP | 2463697 | A1 * | 6/2012 | G02B 6/4454 |
| WO | 2013/177409 | A1 | 11/2013 | |
| WO | 2015/158687 | A1 | 10/2015 | |
| WO | 2018/058507 | A1 | 4/2018 | |
| WO | 2018/187459 | A1 | 10/2018 | |
| WO | 2019/209643 | A1 | 10/2019 | |

OTHER PUBLICATIONS

Extended European Search Report for Application No. 19941584.5 mailed Mar. 17, 2023.

Chinese Office Action for corresponding Patent Application No. 201980101308.6 Mailed Jan. 3, 2025 with English Translation, 18 pages.

European Search Report, European Application No. 19 941 584.5, mailing date Aug. 29, 2025, 5 pages.

Chinese Office Action for corresponding Patent Application No. 201980101308.6 mailed Oct. 18, 2025 with English Translation, 21 pages.

* cited by examiner 132
145
148
140
134
145

DUAL-SIDED SPLICE CASSETTE

This application is a National Stage Application of PCT/CN2019/100774, filed on Aug. 15, 2019, the disclosure of which is incorporated herein by reference in its entirety. To the extent appropriate, a claim of priority is made to the above disclosed application.

BACKGROUND

In fiber optic telecommunications systems, it is common for optical fibers of transmission cables to be split into multiple strands. Further, when such systems are installed, it is known to provide excess capacity in the installations to support future growth and utilization of the fibers. Often in these installations, modules including splitters or multiplexers may be used to provide the connection between transmission fibers and customer fibers.

SUMMARY

Some aspects of the disclosure are directed to a splice cassette including a housing defining first and second interiors facing in opposite directions. A first splice region is disposed in the first interior and a second splice region is disposed in the second interior.

In certain implementations, each of the first and second interiors extends along a length and width of the housing. In an example, the first interior faces upwardly and the second interior faces downwardly.

A splice holder can be mounted at one or more of the splice regions. In some implementations, the splice holder is configured to hold a plurality of single-fiber splices (e.g., a splice between a first single fiber and a second single fiber). In other implementations, the splice holder is configured to hold a multi-fiber splice (e.g., a mass-fusion splice between a first plurality of fibers and a second plurality of fibers).

In certain implementations, the housing includes an anchor region disposed at a rear of the housing.

In certain implementations, the housing includes a termination region disposed at a front of the housing opposite the anchor region.

In certain examples, optical pigtails may extend between the termination region and at least one of the splice regions. Accordingly, one or more feeder fibers can extend into the housing at the anchor region and be routed from the anchor region to the one or more splice regions for optical coupling to the optical pigtails.

In some implementations, multiple fiber cables can be routed to the anchor region of the housing. In one example, one fiber cable includes fibers routed to the first splice region at the first interior and another fiber cable includes fibers routed to the second splice region at the socket interior. In another example, fibers from each cable can be routed to the first splice region and/or to the second splice region.

In some implementations, the fibers from the multiple fiber cables can be optically coupled to the connectorized pigtails leading to the termination region. In other implementations, the fibers from the multiple fiber cables can be optically coupled to each other. In some such implementations, the housing may not include a termination region.

In still other implementations, the interiors can be devoid of splice holders. In such examples, pre-terminated optical fibers can be routed into the housing at the anchor region and routed through the housing to the termination region without being spliced.

In certain implementations, the housing includes a respective cover extending over each of the first and second interiors. In certain examples, each cover is removable from the housing to expose the interior. In certain examples, each cover defines a punch-out section that, when removed, accommodates certain plug connectors that may terminate the pre-terminated optical fibers.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
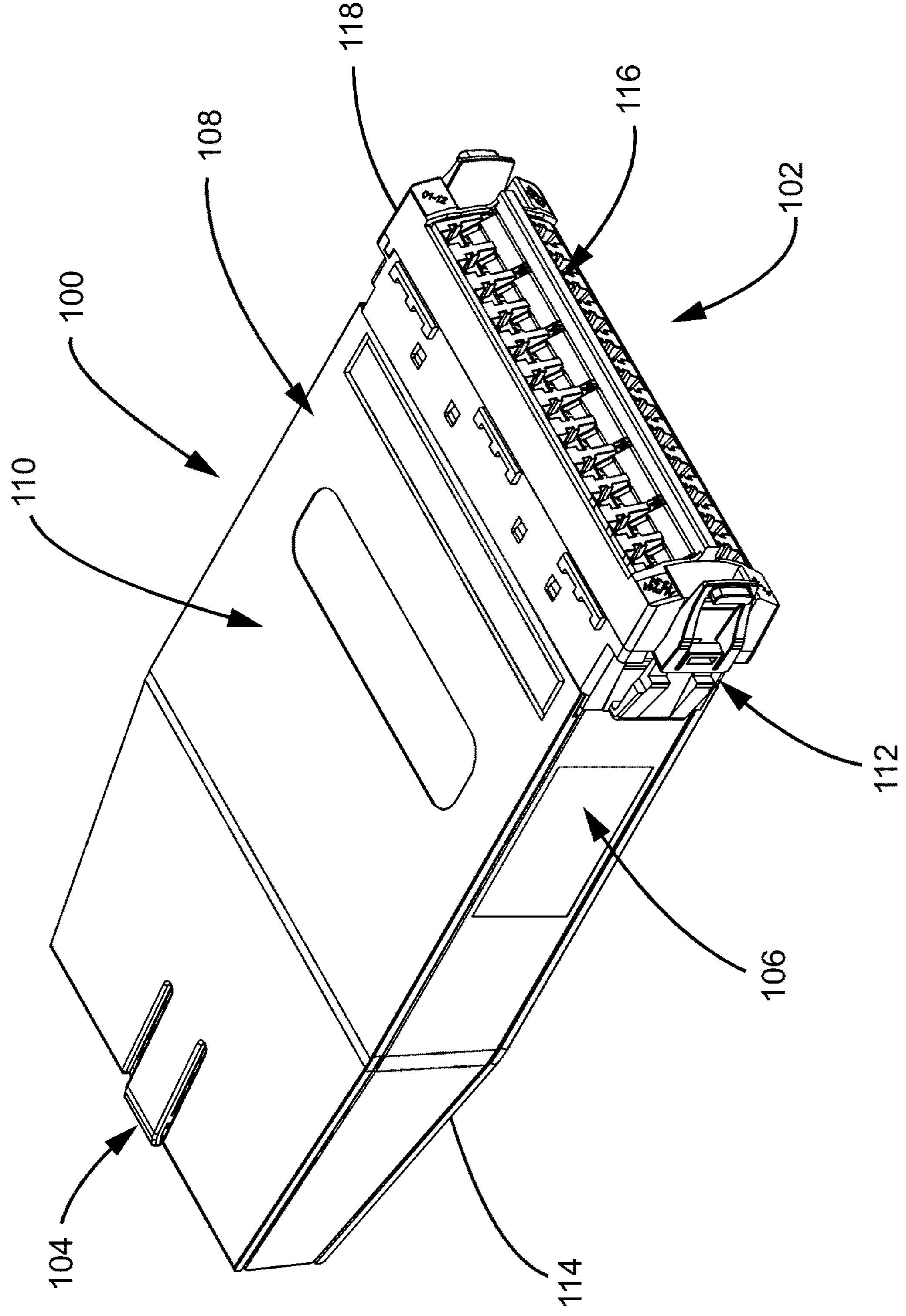
FIG. 1 is a perspective view of a first example splice cassette configured in accordance with the principles of the present disclosure.

Reference will now be made in detail to exemplary aspects of the present disclosure that are illustrated in the accompanying drawings. Wherever possible, the same reference numbers will be used throughout the drawings to refer to the same or like parts.

The present disclosure is directed to a splice cassette 100 defining first and second interiors 132, 134 facing in opposite directions. A first splice region 150 is disposed in the first interior 132 and a second splice region 152 is disposed in the second interior 134. Each interior 132, 134 extends along an elongate dimension of the cassette 100. In certain implementations, the first and second interiors 132, 134 are identical. In certain examples, each interior 132, 134 may extend between an anchor region 138 and a termination region 116 of the cassette 100.

In some implementations, one or more fibers are routed into the cassette 100 (e.g., at the anchor region 138) to be spliced to connectorized pigtails, which are routed to inner ports of the termination region 116. In other implementations, one or more first fibers are routed into the cassette 100 (e.g., at the anchor region 138) to be spliced to respective second fibers routed into the cassette 100 (e.g., at the anchor region 138). As will be discussed herein, the fibers can be routed into either interior 132, 134 of the cassette 100.

As shown in FIG. 1, the cassette 100 extends along a length between a front 102 and a rear 104, along a width between opposite first and second sides 106, 108, and along a height between a first end (e.g., top) 110 and a second end (e.g., bottom) 112. The splice cassette 100 includes a housing 114 that extends fully along the width of the splice cassette 100. The housing 114 extends over at least a majority of the length and over at least a majority of the height. In certain implementations, the cassette 100 has a footprint of a fiber module for the SYSTIMAX ULL panel offered by CommScope of North Carolina.

In some implementations, the splice cassette 100 defines a termination region 116 at which one or more ports are available to receive plug connectors. For example, a termination bezel 118 may be mounted (e.g., snap-fit) to the housing 114 at the front 102 of the splice cassette 100. In the example shown, the termination region 116 defines two rows of ports that each extend across the width of the splice cassette 100. In other examples, however, the termination region 116 can define any number of rows or can otherwise include ports in any desired configuration. In other implementations, the splice cassette 100 includes a blank bezel disposed at the front of the housing 114 instead of the termination bezel 118. The blank front bezel defines a closed front end of the cassette 100.

Figure 2:
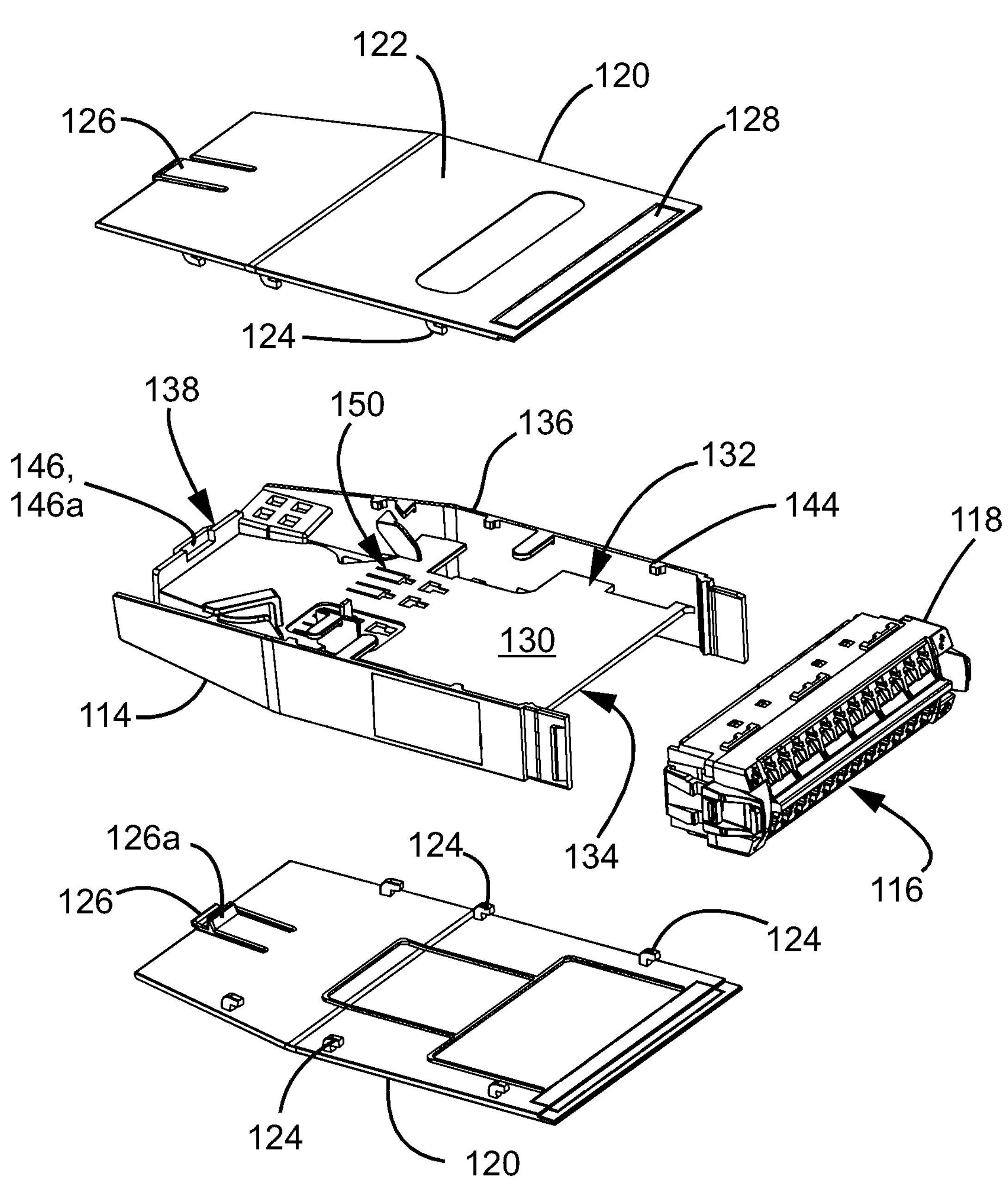
FIG. 2 is a perspective view of the splice cassette of FIG. 1 with covers and a termination bezel exploded away from a housing for ease in viewing.
Figure 3:
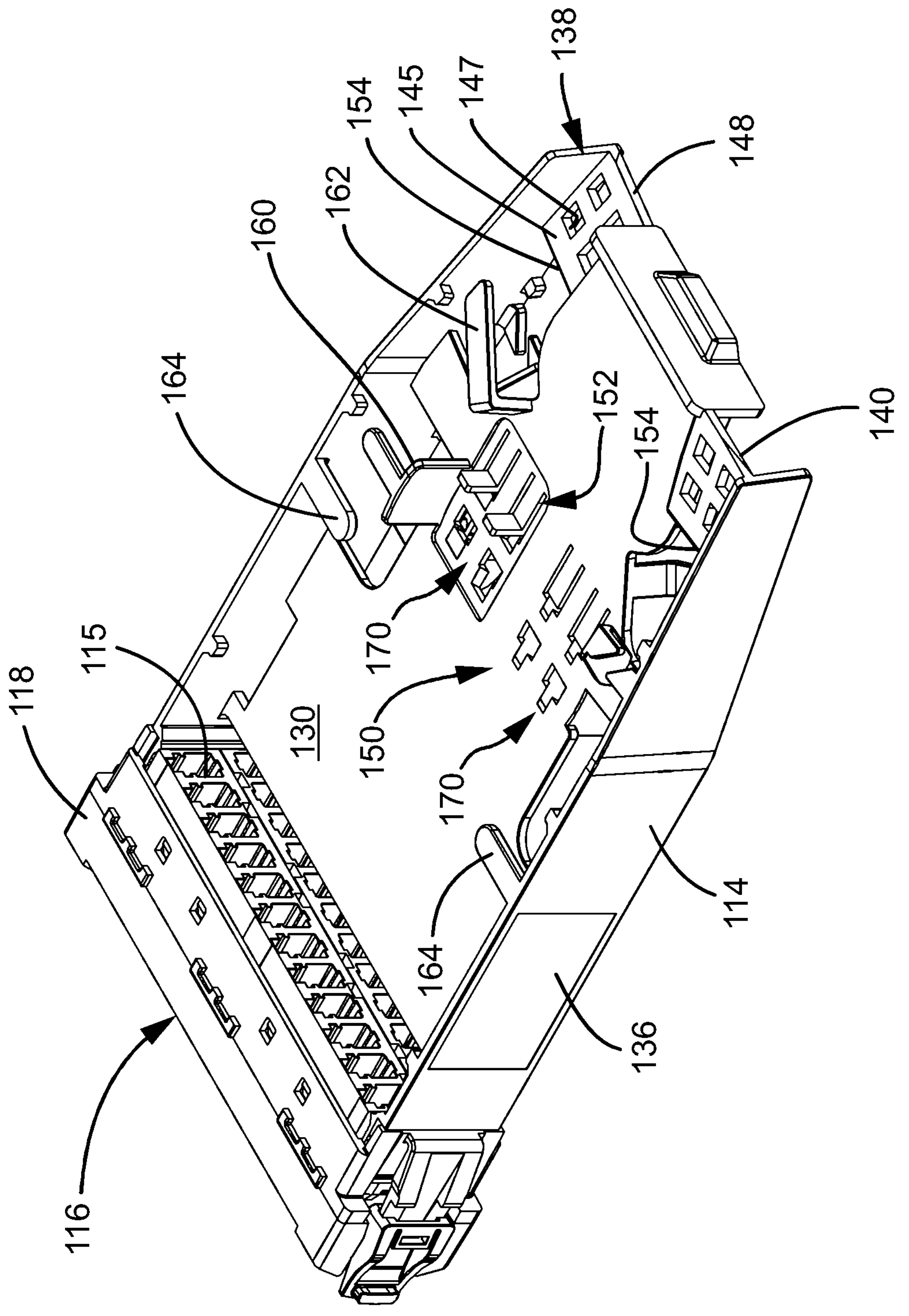
FIG. 3 is a rear perspective view of the splice cassette of FIG. 1 with the covers and splice holders removed.

As shown in FIG. 2, the housing 114 includes a base 130 extending between opposite sidewalls 136. The base 130 is disposed at an intermediate location along the height of the sidewalls 136 to divide an interior of the housing 114 into the first interior 132 and the second interior 134. Each interior 132, 134 extends along the length of the housing 114. Each interior 132, 134 extends along the width of the housing 114. In some implementations, the base 130 is disposed so that the first and second interiors 132, 134 have equal heights. In other implementations, the base 130 can be disposed relative to the sidewalls 136 for the first and second interiors 132, 134 to have unequal heights.

The housing 114 defines a first splice region 150 at which a splice holder (e.g., a first splice holder) can be mounted within the first interior 132 and a second splice region 152 at which a splice holder (e.g., a second splice holder) can be mounted within the second interior 134. In certain implementations, the first splice region 150 is identical to the second splice region 152. In some implementations, a splice holder is mounted at both splice regions 150, 152. In other implementations, a splice holder is mounted at only one of the splice regions 150, 152. In certain implementations, the first and second splice regions 150, 152 are disposed at a common position along the length of the cassette 100.

In certain implementations, the first and second splice regions 150, 152 are offset from each other along the width of the cassette 100 so that the first splice region 150 is disposed closer to the second side 108 and the second splice region 150 is disposed closer to the first side 106. Offsetting the splice regions 150, 152 allows a portion of each splice holder to extend through the base 130 to secure the splice holder to the housing 114.

The housing 114 has an open top to provide access to the first interior 132 and an open bottom to provide access to the second interior 134. Covers 120 can be mounted to the housing 114 to extend over the open top and open bottom of the housing 114. Each cover 120 is removably coupled to the housing 114 to provide selective access to the respective interior 132, 134. Each cover 120 is removable from the housing 114 independent of the other cover 120.

Figure 4:
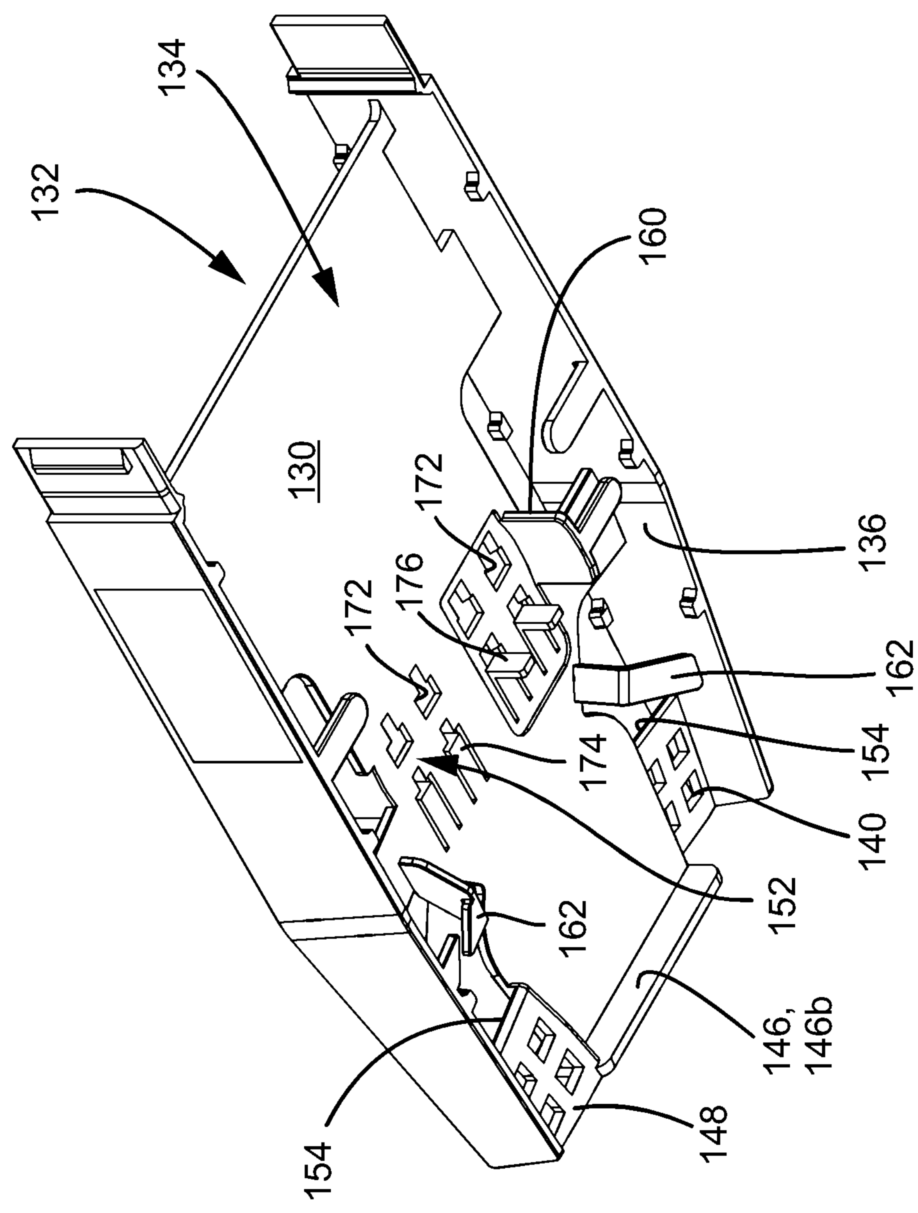
FIG. 4 is a bottom perspective view of the housing of the splice cassette of FIG. 1.
Figure 5:
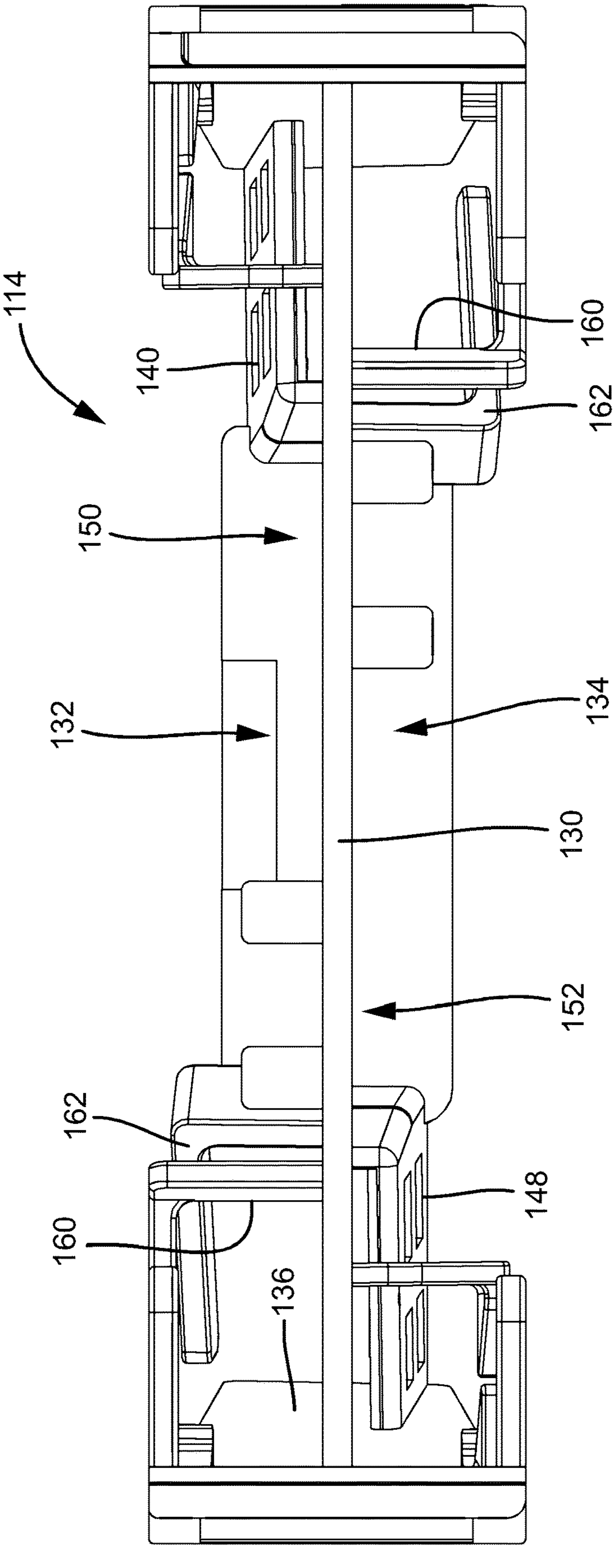
FIG. 5 is a front elevational view of the housing of FIG. 4.
Figure 6:
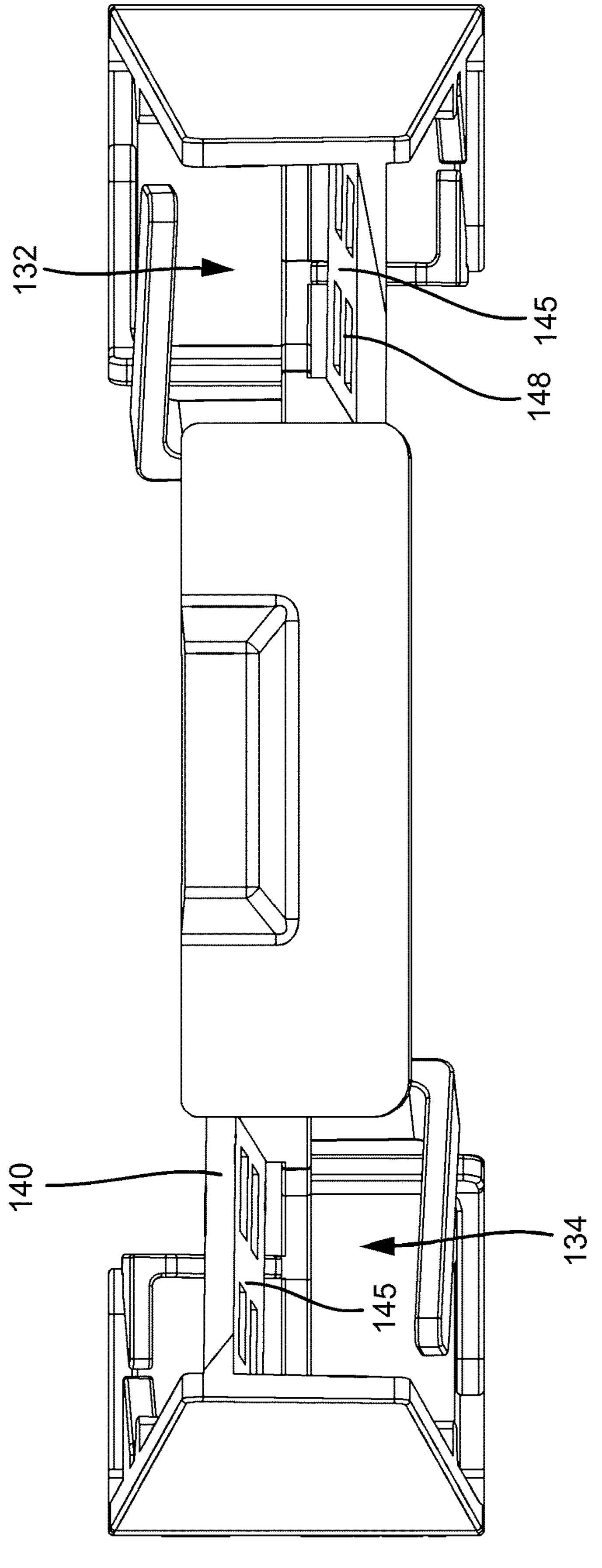
FIG. 6 is a rear elevational view of the housing of FIG. 4.

In certain implementations, the housing 114 and cover 120 include a latching arrangement to secure the cover 120 to the housing 114. In the example shown, the housing 114 includes tabs 144 that project inwardly from the sidewalls 136. The housing 114 also defines a catch surface 146. In some implementations, the catch surface 146 at the first pocket 132 has a common configuration with the catch surface 146 at the second pocket 134. In other implementations, the catch surface 146 at the first pocket 132 defines a notch or recess **146*a* and the catch surface 146 at the second pocket 134 defines a flat surface 146*b* (e.g., compare FIGS. 2 and 4). The cover 120 includes hooks or other receptacles 124 and a latch finger 126. The latch finger 126 includes a tooth 126*a* extending towards the base 130 of the housing 114**.

When the cover 120 is mounted to the housing 114, the hooks 124 of the cover 120 receive the tabs 144 of the housing 114 to inhibit movement towards the front 102 of the housing 114. Interaction between the hooks 124 and tabs 144 also inhibits movement of the cover 120 away from the base 130 (e.g., along the height of the cassette). The tooth **126*a* of the latch finger 126 engages or abuts the catch surface 146 to inhibit movement of the cover 120 towards the rear 104 of the cassette 100. To remove the cover, the latching finger 126 is actuated to remove the tooth 126*a* of the latch finger 126 from the notch or recess 146, thereby allowing movement of the cover towards the rear 104 of the cassette 100**.

In certain examples, the anchor region 138 includes a first anchor station 140 leading fibers to the first interior 132 and a second anchor station 148 leading fibers to the second interior 134 (e.g., see FIGS. 3-6). In certain implementations, each of the anchor stations 140, 148 includes a support surface 145 on which the fibers routed into the cassette 100 can seat. In certain implementations, the support surface 145 may define one or more apertures 147 at which cable ties can be attached to the support surface 145 to hold the fibers at the anchor station 140, 148. In certain implementations, the support surfaces 145 are oriented at an angle relative to the base 130. In the example shown, the support surface 145 at the first anchor station 140 is angled to direct fibers to the second interior 134 and the support surface 145 at the second anchor station 148 is angled to direct fibers to the first interior 132.

In certain examples, the cassette 100 defines pass-through apertures 154 that allow fibers at each anchor station 140, 148 to reach either of the first and second interiors 132, 134. For example, each pass-through aperture 154 extends between the base 130 and the support surface 145 at one of the anchor stations 140, 148. In other implementations, the pass-through apertures 154 may be fully defined through the base 130 at a location spaced from the anchor stations 140, 148. Accordingly, a plurality of fibers routed to the first anchor station 140 can be routed fully into the second interior 134 or can be divided between the first interior 132 and the second interior 134.

Figure 7:
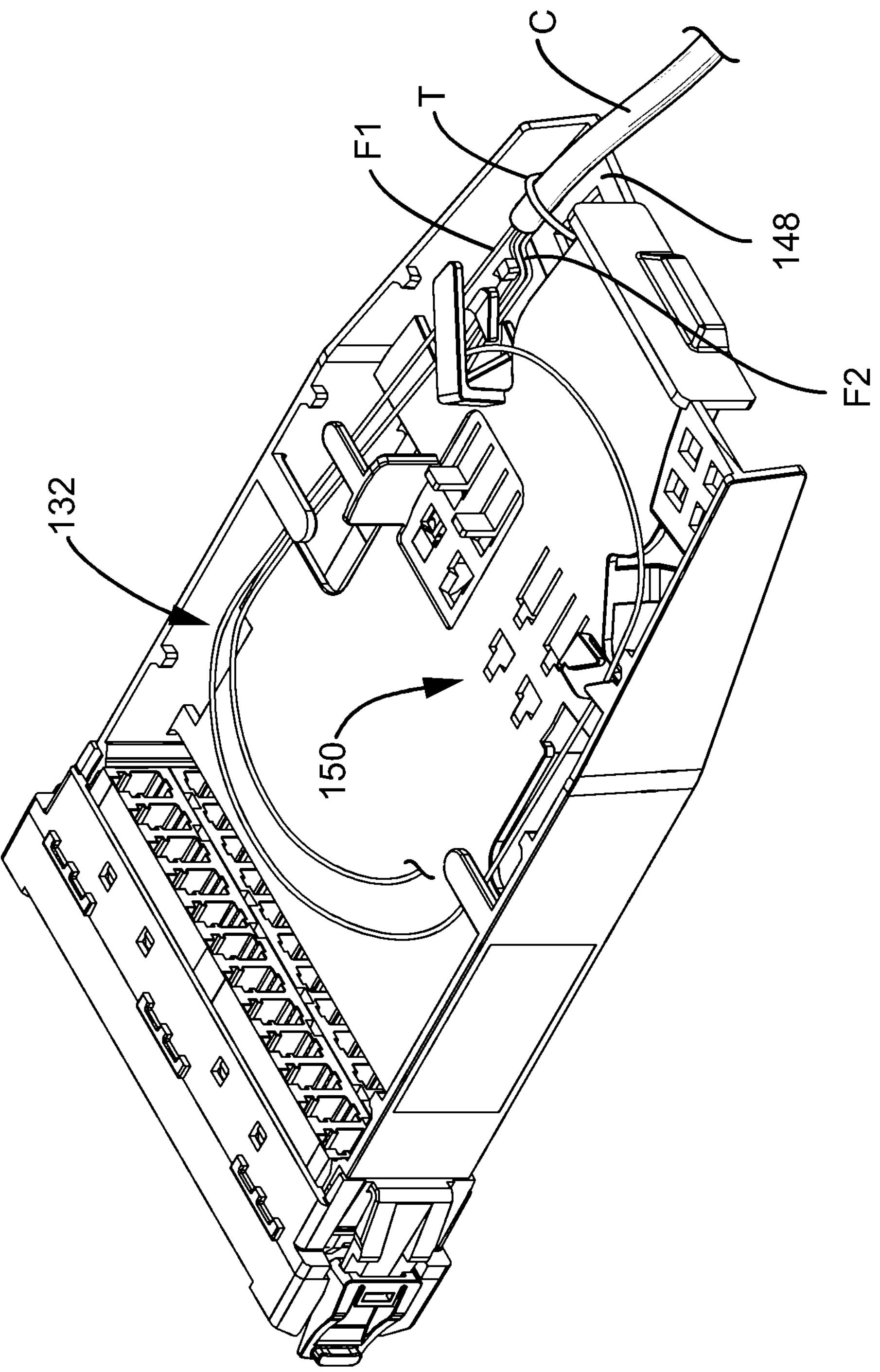
FIG. 7 shows feeder fibers extending into the cassette from the anchor region.

FIG. 7 shows an example cabling configuration for a cable C routed into the cassette 100. The cable C includes at least a first optical fiber F1 and a second optical fiber F2. Of course, the cable C can include additional optical fibers. For the sake of convenience, FIG. 7 is described herein as if the first interior 132 and the first splice region 150 are visible. However, since the first and second interiors 132, 134 have a common configuration, FIG. 7 could just as easily be described as showing the second interior 134 and the second splice region 152.

The cable C is laid on the support surface 145 of the second anchor station 148. A cable tie T is wrapped over the cable C and through the apertures 147 in the support surface 145 to secure the cable C at the second anchor station 148. In the example shown, the cable C has a jacket, buffer, or other sheath around the fibers F1, F2 and the cable tie T is wrapped around the sheath. In other examples, however, the fibers F1, F2 can be routed into the cassette without a surrounding sheath.

In the example shown in FIG. 7, the first fiber F1 extends into the first interior 132 and the second fiber F2 extends through the pass-through aperture 154 at the second anchor station 148 and into the second interior 134. The first fiber F1 is wrapped in a coil within the first interior 132. In the example shown, an end of the first fiber F1 is routed to the first splice region 150. In other examples, the end of the first fiber F1 may be connectorized and routed to inner ports 115 of the termination region 116. The second fiber F2 may follow a similar path within the second interior 134.

In certain implementations, the housing 114 includes fiber guide members to manage the optical fibers F1, F2 routed within the interiors 132, 134. The fiber guide members direct the fibers F1, F2 around the splice region 150, 152 within the interior 132, 134. In certain implementations, the fiber guide members direct the fibers F1, F2 around an inner perimeter of the housing 114 between the sidewalls 136 and the splice regions 150, 152. In various implementations, the fiber guide members include bend radius limiters 160 (e.g., partial spools, full spools, etc.) and/or retention fingers (e.g., fingers 164 projecting from the sidewalls 136, fingers 162 projecting from the base 130, etc.). In certain examples, the configuration of fiber guide members in the first interior 132 is identical to the configuration of fiber guide members in the second interior 134.

Figure 8:
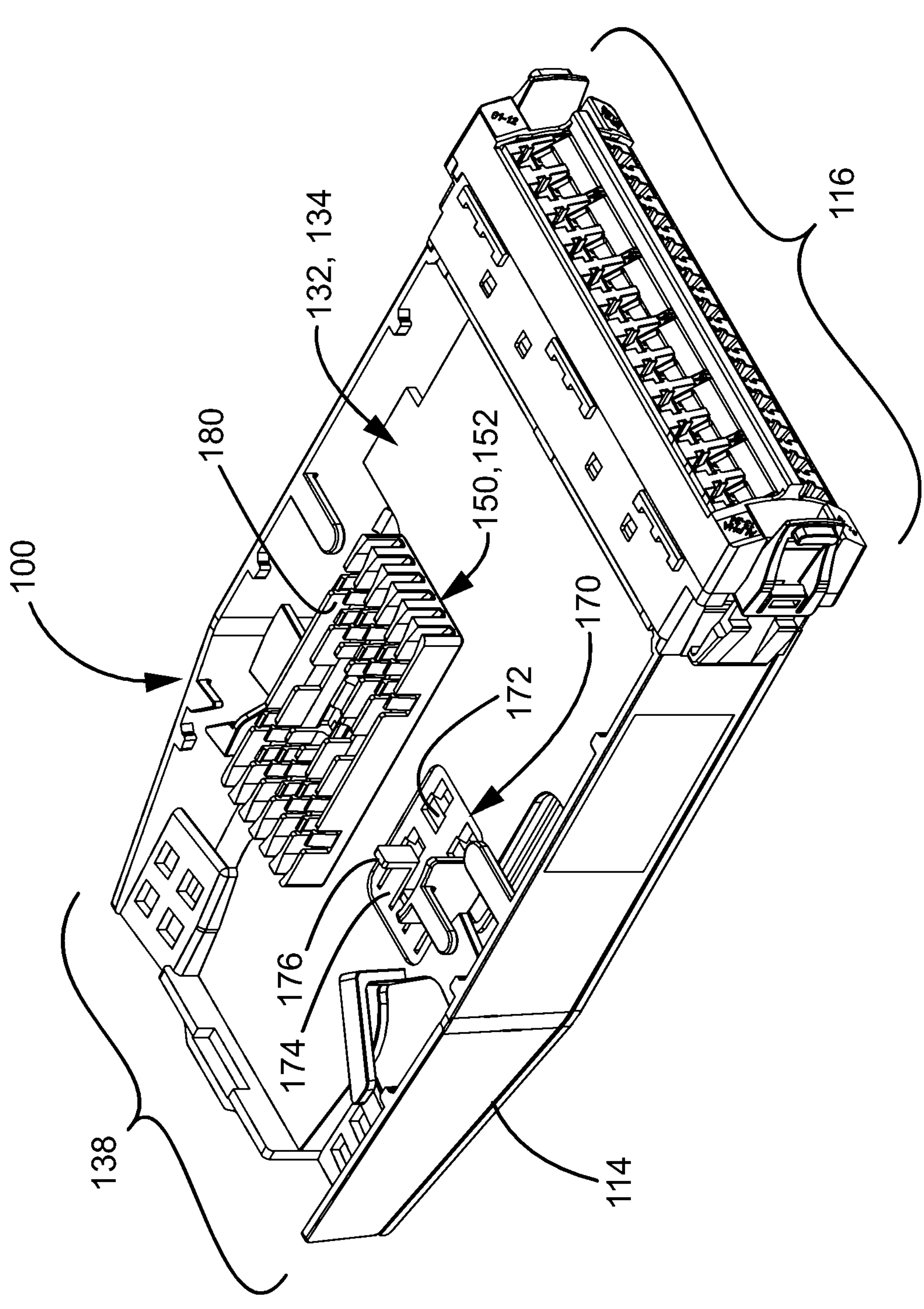
FIG. 8 is a front perspective view of the splice cassette of FIG. 3 with a first example splice holder mounted thereto, the first example splice holder configured to hold multiple single-fiber splices.
Figure 9:
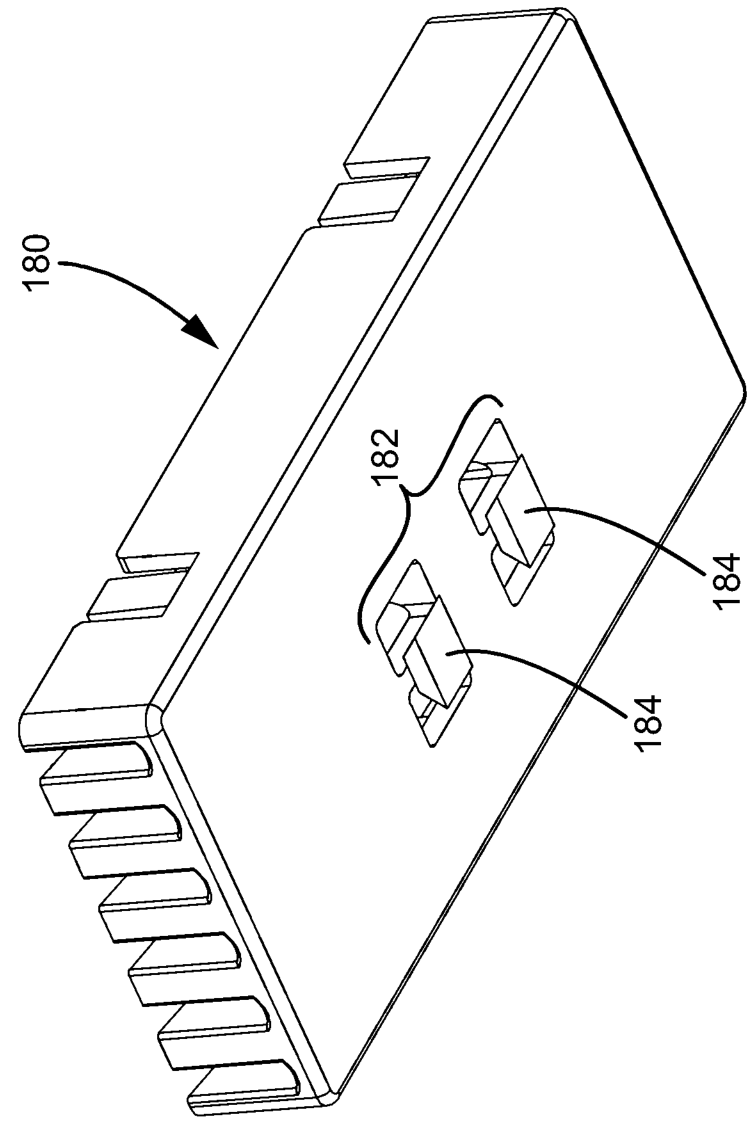
FIG. 9 is a bottom perspective view of the first example splice holder of FIG. 8 oriented so that the mounting arrangement is visible.
Figure 10:
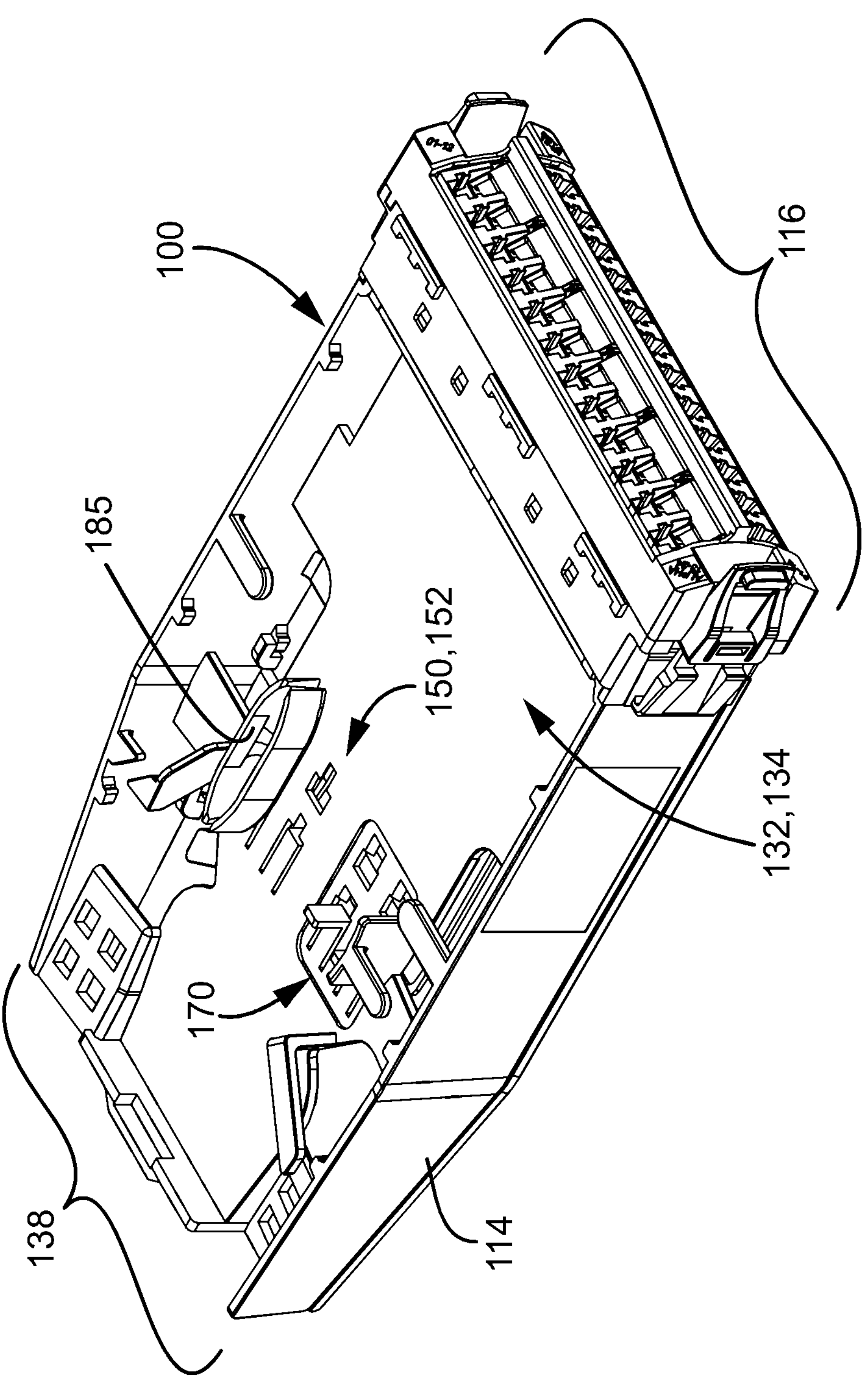
FIG. 10 is a front perspective view of the splice cassette of FIG. 3 with a second example splice holder mounted thereto, the second example splice holder configured to hold a multi-fiber splice.
Figure 11:
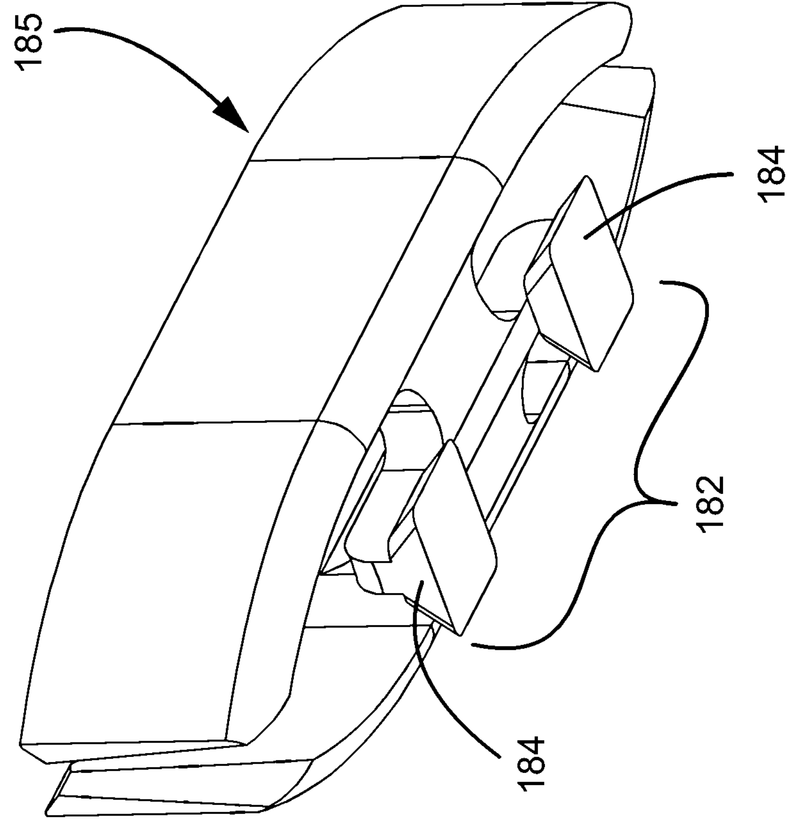
FIG. 11 is a bottom perspective view of the second example splice holder of FIG. 10 oriented so that the mounting arrangement is visible.

FIGS. 8-11 illustrate various splice holders 180, 185 mounted within the cassette 100. In certain implementations, the first interior 132 of the cassette 100 has the same configuration as the second interior 134 of the cassette 100. Accordingly, the interior shown in FIGS. 8 and 10 can be either of the first and second interiors 132, 134. FIGS. 8 and 9 illustrate a first example splice holder 180 configured to hold a plurality of single-fiber splices. FIGS. 10 and 11 illustrate a second example splice holder 185 configured to hold a multi-fiber splice (e.g., a mass fusion splice).

Each of the splice holders 180, 185 includes a mounting arrangement 182 at one side of the splice holder. The splice holder 180, 185 is configured to retain the splice(s) at the opposite side from the mounting arrangement 182. The first splice holder 180 includes a body defining a plurality of channels, each channel configured to receive an optical splice. In the example shown, the channels are aligned between the anchor region 138 and the termination region 116.

In certain examples, the mounting arrangement 182 includes one or more dovetail shaped tabs 184. In the example shown, the mounting arrangement 182 includes two spaced dovetail shaped tabs 184. The mounting arrangement 182 of the splice holder 180, 185 is configured to mate with a splice holder mounting arrangement 170 disposed at one of the splice regions 150, 152.

In certain examples, the splice holder mounting arrangement 170 includes a releasable retention arrangement. In the example shown, the splice holder mounting arrangement includes an aperture 172 aligned with a flexible finger 174 extending into a slot (e.g., see FIG. 4). The aperture 172 has a larger side closer to the finger 174 and a smaller side farther from the finger 174. The slot also defines a larger side in which the finger 174 extends and a smaller side extending beyond the finger 174 towards the aperture 172. The flexible finger 174 includes an abutment tab 176 extending into the opposite interior 134, 132 from the splice region 150, 152. In the example shown, a pair of splice holder mounting arrangements 170 are disposed at each splice region 150, 152. In other examples, a greater or fewer number (e.g., one, three, four, etc.) of splice holder mounting arrangements 170 can be disposed at each splice region 150, 152.

When the splice holder 180, 185 is mounted to a splice region 150, 152, one of the tabs 184 extends into the larger part of the aperture 172 and the other of the tabs 184 extends into the slot by deflecting the finger 174 into the opposite interior region. The splice holder 180, 185 can then be slid along the aperture 172 and slot until the first tab 174 aligns with the smaller side of the aperture 172. Sliding the holder 180, 185 allows the second tab to clear the finger 174, which allows the finger 174 to snap back to the undeflected position. The abutment tab 176 engages the second tab 184 when in the undeflected position, thereby inhibiting sliding of the splice holder 180, 185 back towards the larger side of the aperture 172. The splice holder 180, 185 can be released from the splice holder mounting arrangement 170 be deflecting the finger 174 out of the slot and then sliding the holder 180, 185 towards the larger sides of the aperture 172 and slot.

Other example releaseable dovetail arrangements can be found in PCT Application No. PCT/US2019/028245, filed Apr. 19, 2019, the disclosure of which is hereby incorporated herein by reference.

In some implementations, only one splice holder 180, 185 is mounted at the splice region 150, 152. In some examples, the splice holder 180 extends fully across the splice region 150, 152, thereby blocking access to any other splice holder mounting arrangements 170 at the splice region. In other examples, the splice holder 185 extends only across one of the splice holder mounting arrangements 170. In some such examples, the user can select to which splice holder mounting arrangements 170 the holder 185 mounts. In other such examples, multiple splice holders 185 can be mounted at the same splice region 150, 152.

Figure 12:
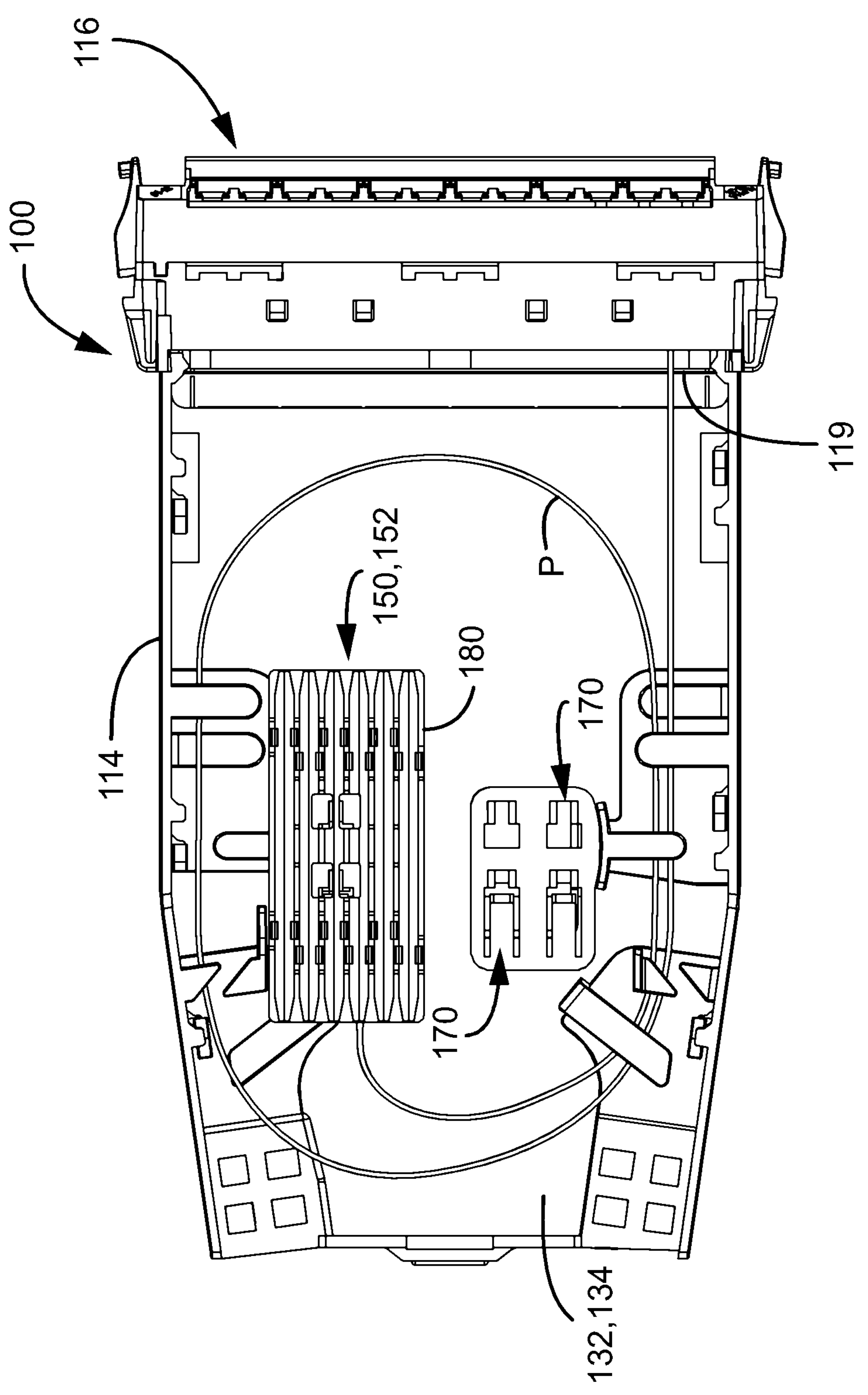
FIG. 12 is a top plan view of the splice cassette of FIG. 8 showing an example connectorized pigtail routed from the splice region to the termination region.
Figure 13:
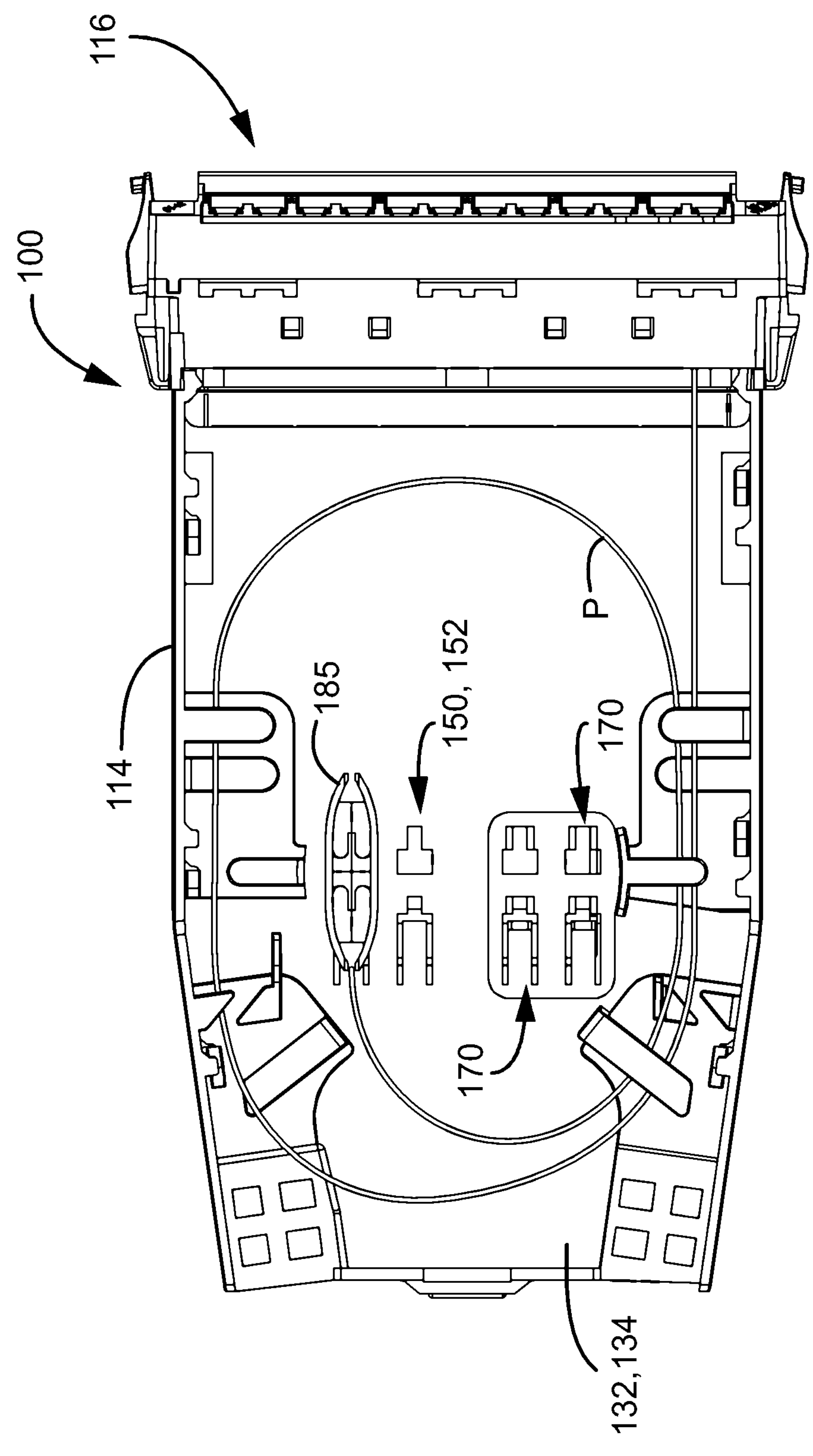
FIG. 13 is a top plan view of the splice cassette of FIG. 10 showing an example connectorized pigtail routed from the splice region to the termination region.

FIGS. 12 and 13 illustrate example cabling configurations for connectorized pigtails P routed between the splice region 150, 152 and inner ports 119 of the termination region 116. The connectorized pigtails P are routed from the splice holder 180, 185, through the fiber guide members, to the inner ports 119. In certain implementations, the connectorized pigtails P are coiled along an inner perimeter of the respective interior 132, 134.

In some implementations, the connectorized pigtails P can be pre-cabled in a factory prior to shipping the cassette 100 to the field (e.g., to a customer). In other implementations, the cassette 100 can be shipped without cabling and the connectorized pigtails can be added in the field. In certain implementations, the cable(s) C are routed into the cassette 100 and to the splice region 150, 152 in the field. In certain examples, to splice the fibers F1, F2 of the cable(s) C to the connectorized pigtails P, the splice holder 180, 185 is removed from the cassette 100. If the connetorized pigtails P are already routed to the splice region 150, 152, the pigtails P are unwound from the cassette 100. The connectorized pigtails P and the fibers F1, F2 are spliced together external of the cassette 100. Then, the connectorized pigtails P and the fibers F1, F2 are coiled together around the splice holder 180, 185. The splice holder 180, 185 is mounted at the splice region 150, 152 and the coils are disposed in the respective interior 132, 134.

In some implementations, a first cable (e.g., a 12-fiber cable) is secured to the first anchor station 140 and fibers of the first cable extend through the second interior 134 to the splice region 152 at which the fibers are spliced to connectorized pigtails plugged into one row of ports at the termination region 116. A second cable (e.g., a 12-fiber cable) is secured to the second anchor station 148 and fibers of the second cable extend through the first interior 132 to the splice region 150 at which the fibers are spliced to connectorized pigtails plugged into another row of ports at the termination region 116.

In other implementations, a first cable (e.g., a 24-fiber cable) is secured to the first anchor station 140. First fibers (e.g., a first twelve fibers) of the first cable extend through the second interior 134 to the splice region 152. Second fibers (e.g., a second twelve fibers) of the first cable extend through the pass-through aperture 154 and into the first interior 132. The second fibers are then routed through the first interior 132 to the splice region 150. The first and second fibers are spliced to connectorized pigtails and the splices are retained at splice holders 180, 185 at the splice regions 150, 152.

In other implementations, a first cable (e.g., a 12-fiber cable) and a second cable (e.g., a 12-fiber cable) are both secured to the first anchor station 140. First fibers (e.g., a first six fibers) of each cable extend through the second interior 134 to the splice region 152. Second fibers (e.g., a second six fibers) of each cable extend through the pass-through aperture 154 and into the first interior 132. The first fibers of the first cable are spliced to the first fibers of the second cable and the spliced are held at the second splice region 152 within the second interior 134. The second fibers of the first cable are spliced to the second fibers of the second cable and the spliced are held at the first splice region 150 within the first interior 132. No fibers are routed to the termination field 116. In some such implementations, the cassette 100 does not include a termination field 116.

Other configurations are possible. For example, certain configurations utilize a splice holder 180, 185 in only one of the interiors 132, 134. In some implementations, one type of splice holder 180, 185 may be mounted in the first interior 132 and another type of splice holder 185, 180 may be mounted in the second interior 134. In other implementations, the same type of splice holder 180, 185 is mounted within the interiors 132, 134 of a splice cassette 100.

In still other implementations, the cassette 100 can be used to terminate a pre-connectorized cable at the termination region 116 without splicing within the cassette 100. For example, a cable can be routed into the cassette 100 via the anchoring region 138 (e.g., through one of the anchor stations 140, 148). Ends of the fibers of the cable are terminated at plug connectors. The fibers are managed within one or both interiors 132, 134 of the cassette 100 using the fiber guide members. The plug connectors are inserted into the inner ports 119 of the termination region 116. In certain implementations, one or more apertures 128 may be opened in one or both covers 120 to accommodate certain sizes of the plug connectors. For example, a punch-out region 128 can be removed from the cover 120 to accommodate latching arms of certain types of plug connectors.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A splice cassette comprising:

a housing extending along a length between a front and a rear, extending along a width between opposite first and second sides, and extending along a height between opposite first and second ends, the housing defining a first interior open at the first end of the housing and a second interior open at the second end of the housing, each of the first and second interiors extending along at least a majority of the length and along at least a majority of the width;

a first splice region disposed in the first interior and facing towards the first end of the housing;

a second splice region disposed in the second interior and facing towards the second end of the housing;

a cable anchor region disposed at the rear of the housing, wherein the cable anchor region includes a first anchor position and a second anchor position, the first anchor position leading to the first interior, and the second anchor position leading to the second interior; and a termination region disposed at the front of the housing, the termination region including a first row of adapters and a second row of adapters;

wherein each of the first and second interiors of the housing extends between a respective one of the first and second ancho positions and a respective one of the first and second rows of adapters.

2. The splice cassette of claim 1, further comprising a pass-through aperture extending between the first and second interiors.

3. The splice cassette of claim 1, further comprising a first pass-through aperture disposed at the first anchor position and a second pass-through aperture disposed at the second anchor position, the first pass-through aperture providing selective routing to both of the first and second interiors from the first anchor position.

4. The splice cassette of claim 1, wherein the first splice region is offset toward the first side and the second splice region is offset toward the second side.

5. The splice cassette of claim 1, further comprising a splice chip disposed at the first splice region, the splice chip configured to receive a plurality of single-fiber splices.

6. The splice cassette of claim 5, wherein a release arrangement for the splice chip is accessible from the second interior.

7. The splice cassette of claim 1, further comprising a splice holder disposed at the first splice region, the splice holder configured to receive a multi-fiber splice.

8. The splice cassette of claim 1, further comprising a plurality of fiber pigtails extending between first and second ends, the first ends being disposed at the first splice region, the second ends being terminated at plug connectors.

9. The splice cassette of claim 1, further comprising a fiber cable including a plurality of optical fibers each having a first end terminated at a respective plug connector.

10. The splice cassette of claim 9, further comprising a termination bezel disposed at the front of the housing, the termination bezel defining a plurality of inner ports configured to receive the plug connectors.

11. The splice cassette of claim 10, wherein the termination bezel holds the first and second rows of adapters defining the inner ports.

12. The splice cassette of claim 1, further comprising a blank bezel disposed at the front of the housing, the blank bezel defining a closed front end of the cassette.

13. The splice cassette of claim 1, further comprising:

a first cable secured to the cable anchor region, the first cable including at least a first fiber extending into the first interior and routed to the first splice region; and a second cable secured to the cable anchor region, the second cable including at least a second fiber extending into the first interior and routed to the first splice region to be spliced to the first fiber.

14. The splice cassette of claim 13, wherein the first cable and second cables are both secured to the first anchor position.

15. The splice cassette of claim 13, wherein the first cable is secured to the first anchor position and the second cable is secured to the second anchor position.

16. The splice cassette of claim 1, further comprising first and second covers positioned over the respective first and second ends of the housing.

17. The splice cassette of claim 1, wherein the first anchor position is disposed at the first side of the rear and the second anchor position is disposed at the second side of the rear.

18. A splice cassette comprising:

a housing including a base having a first major side and an opposite second major side, each of the first and second major sides extending along a length of the housing between a front and a rear;

a termination bezel disposed at the front of the housing;

a first splice region disposed at the first major side of the base;

a second splice region disposed at the second major side of the base, the second splice region being laterally offset from the first splice region;

a first anchor position disposed at the rear of the housing, the first anchor position including a first angled surface leading to the first major side of the base; and a second anchor position disposed at the rear of the housing, the second anchor position including a second angled surface leading to the second major side of the base.

19. The splice cassette of claim 18, further comprising a splice holder mounted at the first splice region.

20. The splice cassette of claim 19, wherein the splice holder is configured to hold multiple single-fiber splices.

21. The splice cassette of claim 19, wherein the splice holder is configured to hold a multi-fiber splice.

22. The splice cassette of claim 19, wherein the splice holder is a first splice holder, and wherein the splice cassette further comprises a second splice holder mounted at the second splice region.

23. The splice cassette of claim 22, wherein the second splice holder is configured to hold multiple single-fiber splices.

24. The splice cassette of claim 22, wherein the second splice holder is configured to hold a multi-fiber splice.

25. The splice cassette of claim 18, wherein the first and second splice regions include splice holder mounting arrangements that include releasable retention arrangements.

26. A cassette comprising:

a housing extending along a length between a front and a rear, extending along a width between opposite first and second sides, and extending along a height between opposite first and second ends, the housing defining a first interior open at the first end of the housing and a second interior open at the second end of the housing, each of the first and second interiors extending along at least a majority of the length and along at least a majority of the width;

a termination bezel disposed at the front of the housing;

wherein the first and second interiors are equal in size and are on opposite sides of an interior bulkhead;

first and second covers positioned over the respective first and second ends of the housing; and a cable anchor region disposed at the rear of the housing, wherein the cable anchor region comprises a first anchor position at the first side of the rear and a second anchor position at the second side of the rear, the first and second anchor positions communicating with the first and second interiors, respectively.

* * * * *